Nov. 14, 1939.  J. W. RICE  2,179,600
VEHICLE BODY
Filed Sept. 15, 1938　　　3 Sheets-Sheet 1
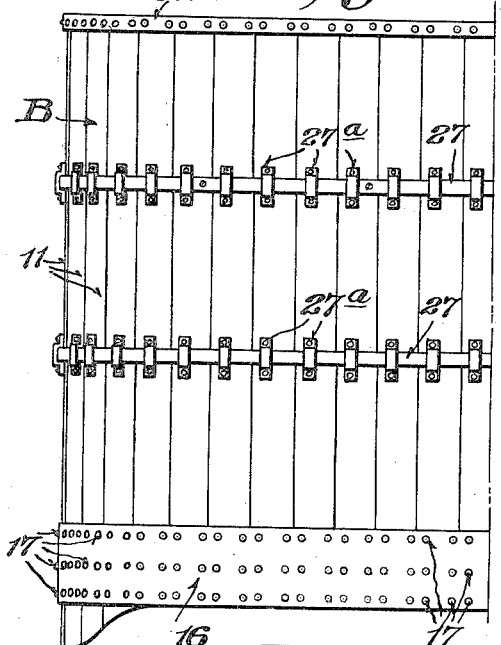
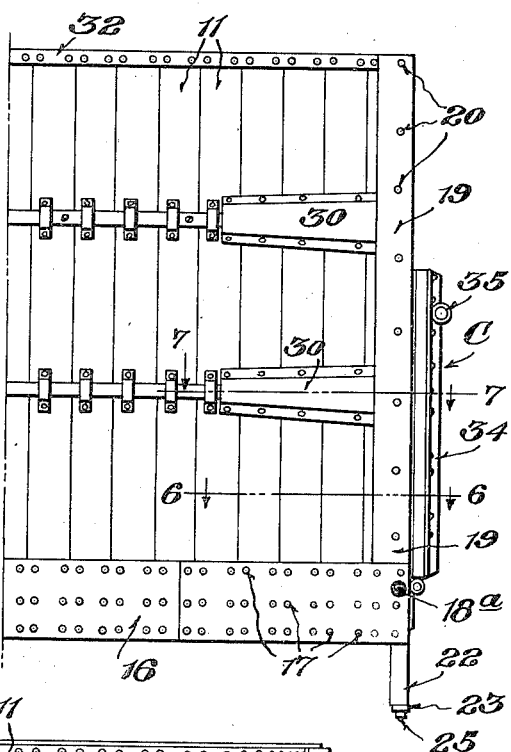
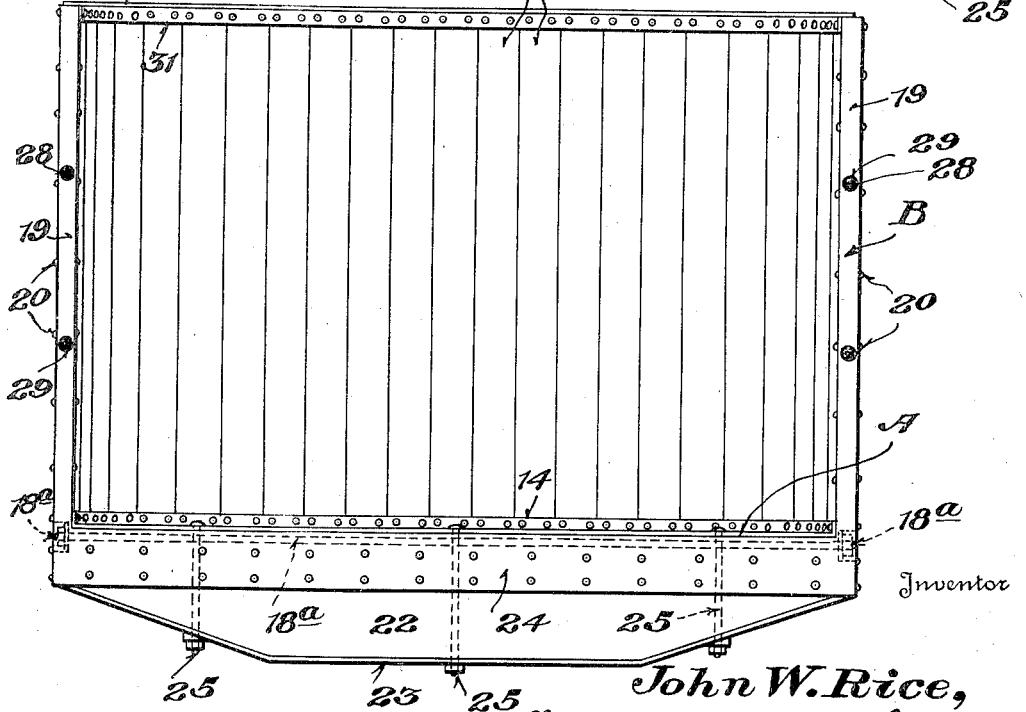
Inventor
John W. Rice,
By Walhauster & Groff
Attorneys Nov. 14, 1939.                J. W. RICE                2,179,600
                             VEHICLE BODY
                        Filed Sept. 15, 1938        3 Sheets-Sheet 2
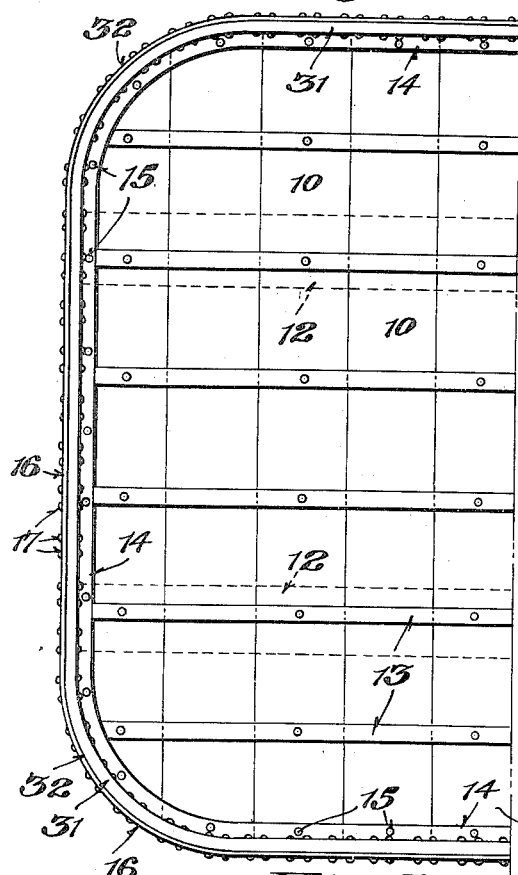
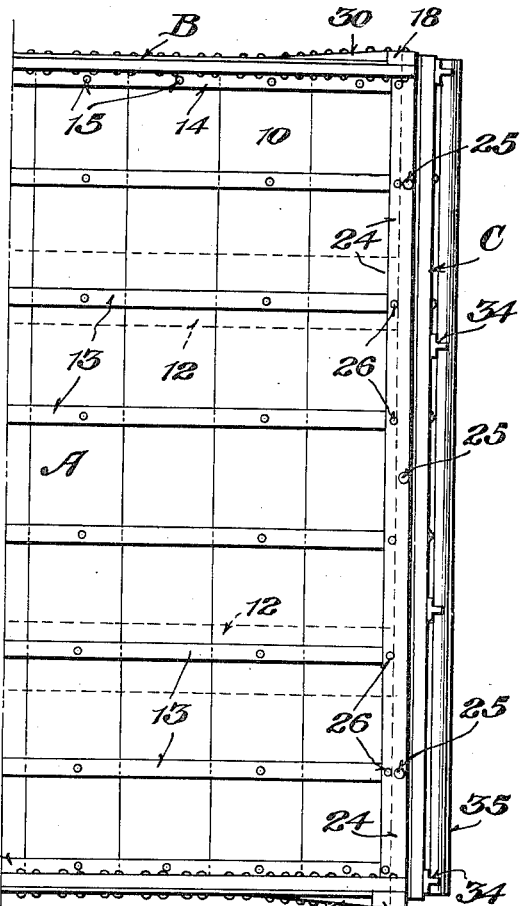
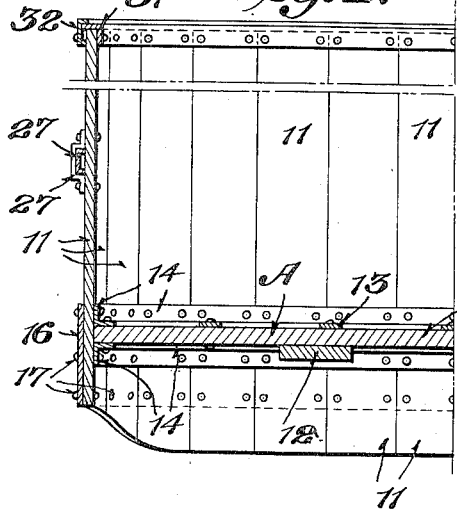
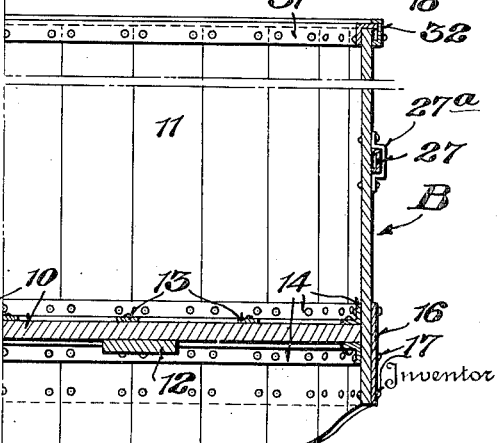
Inventor
John W. Rice,
By Wallhaupter & Groff
Attorneys Nov. 14, 1939.  J. W. RICE  2,179,600
VEHICLE BODY
Filed Sept. 15, 1938  3 Sheets-Sheet 3
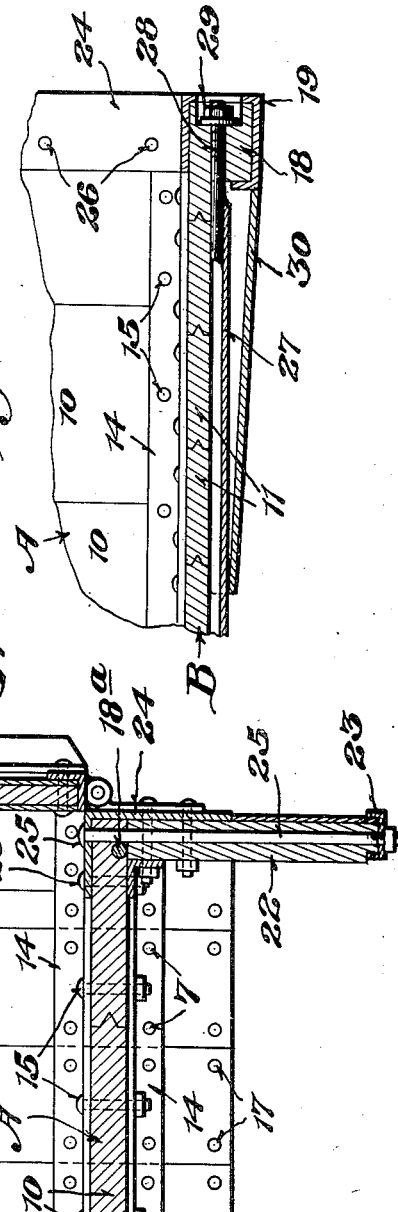
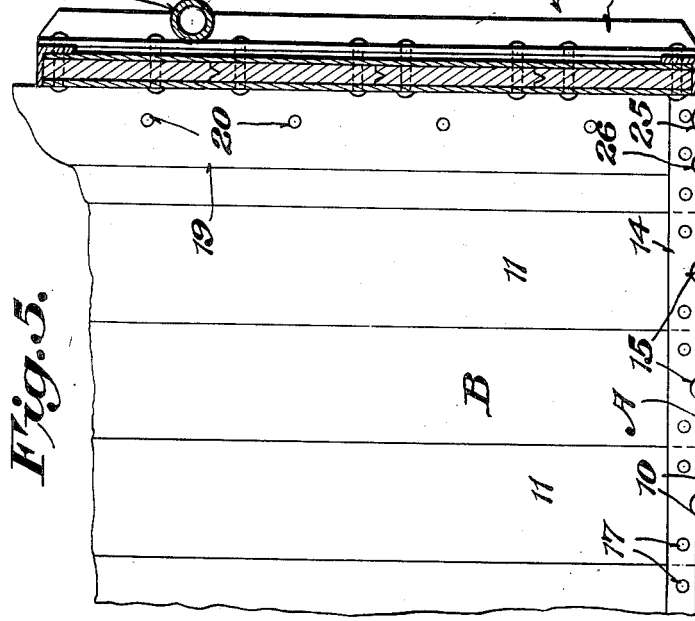
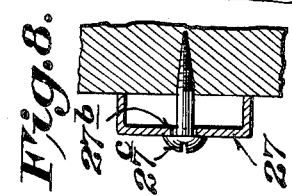
Inventor
John W. Rice,
By Wolhaupter & Groff
Attorney

UNITED STATES PATENT OFFICE 2,179,600

VEHICLE BODY

John W. Rice, Amarillo, Tex., assignor of one-half to W. W. Gentry, Chickasha, Okla.

Application September 15, 1938, Serial No. 230,106

4 Claims. (Cl. 296—28)

This invention is a continuation in part of the invention disclosed in my co-pending application, Serial No. 105,807, filed October 15, 1936, and relates to vehicle bodies, particularly bodies for trucks, trailers and other transportation units made of wood and steel, and wherein the novel assembly of parts all contribute to provide an especially strong, rigid, and durable construction.

A primary object is to provide a vehicle body comprising a horizontal floor and a vertical wall structure each preferably composed of strips or planks, the strips of the wall portion being held together under compression around the edge of the floor which serves as a base about which the vertical wall is assembled and bound under the force of tensioning bands. In that connection, a special feature of the invention resides in extending the lower end of the wall structure below the floor and utilizing steel reinforcement at the junction of the crossing wall and floor thereby to provide between the lower end of the wall and the floor, a reinforced I-beam structure, wherein the floor constitutes the web of the beam and the lower end of the wall adjacent thereto serves as the chords.

A special object is to provide a vehicle body which, because of its novel construction, may be readily made in any desired size or capacity from more or less standardized parts adapted to be readily cut or fabricated according to predetermined specifications.

Another object is to provide a vehicle body of the character mentioned which is light in weight, tight, cheap and easy to produce and repair and thoroughly satisfactory in use.

With the foregoing and other objects in view, which will become more fully apparent as the nature of the invention is better understood, the same consists in the novel features of construction, combination and arrangement of parts as will be hereinafter more fully described, illustrated in the accompanying drawings and defined in the appended claims.

In the accompanying drawings, wherein like parts in the different views—

Figure 1 is a side elevation of a vehicle body constructed in accordance with the invention.

Figure 2 is a top plan view of the body.

Figure 3 is a rear elevation of the body with the tail gate removed.

Figure 4 is a transverse section through the body.

Figure 5 is a vertical section through the rear portion of the body and the tail gate.

Figure 6 is an enlarged horizontal section on the line 6—6 of Fig. 1.

Figure 7 is an enlarged horizontal section on the line 7—7 of Fig. 1; and

Figure 8 is a detail section of one of the tensioning straps or bands showing how the same is fastened to the side wall.

Referring in detail to the practical embodiment of the invention illustrated in the drawings, it will be observed that the present vehicle body comprises a floor, designated generally as A, a vertical wall structure designated generally as B and, preferably but not necessarily, a tail gate designated generally as C.

The floor A is composed of strips 10 and the front and side wall structure B is composed of strips 11. On the other hand, while the tail gate C may be of any desired construction, it preferably is also composed of strips 12.

The strips 10, 11 and 12 may be of any suitable thickness and width and may be formed from wood or metal. They are of special tongue and groove construction and preferably the tongues and grooves thereof are of V-shape in cross section, although they may be of any other suitable or desired form.

As viewed in plan the vehicle body either is continuously rounded at its front or at least has rounded corners. In either case, the strips 10 comprising the floor A extend transversely of the body and the strips 11 comprising the front and side wall structure B extend vertically. On the other hand, if the tail gate is provided and if it is comprised by strips, the strips thereof may extend either vertically or horizontally. Preferably, however, they extend vertically.

Underlying the transversely extending floor strips 10 are members 12 which extend longitudinally of the body, preferably from end to end thereof, and to which the floor strips 10 are suitably fastened, the said floor strips being disposed, of course, with their tongues and grooves in interfitting relationship. There are at least two of the longitudinally extending members 12 and these are spaced apart corresponding to the spacing of the side frame elements of the vehicle to which the body is to be applied so as to rest upon said side frame elements. Because of this construction; that is, because of the floor strips 10 extending transversely of the body and being connected to underlying longitudinally extending members such as the members 12, any necessity of sills is avoided and yet the floor is stiff and strong. The front floor strips 10 are of course, formed to correspond to either the continuously rounded front or to the rounded corner construction of the front of the body, as the case may be. The top of the floor is provided with the metal strips or runners 13 which not only further reinforce the floor, but provide scuff or wear surfaces on which boxes or barrels rest and which take the abrasion due to shifting such articles over the floor.

The vertically extending strips 11 comprising the front and the sides of the body are, of course, disposed in edge to edge relationship with their tongues and grooves interfitting. They are disposed against the edges of the strips 10 comprising the floor A and project below the floor, and on the other hand, they may extend to any suitable height above the floor.

Extending continuously along the front and side margins of the floor A and disposed in the included angles formed between the wall and floor, are angle iron members 14, 14 one disposed upon the top of the floor and the other against the under side thereof (Fig. 4), with their horizontal flanges lying flatly against the floor and their vertical flanges disposed outwardly flush or substantially flush with the edge of the floor. By means of rivets, through bolts, or the like 15 passing through the horizontal flanges of the angle iron members 14 and through the floor strips 10, the said angle iron members are securely fastened to the floor and serve as additional securing means for the floor strips, binding the latter securely together at their ends.

The inner faces of the vertical side and end wall strips 11 abut the vertical flanges of the angle iron members 14, and, against the outer faces of said strips 11, in alinement with said angle iron members, is disposed a relatively wide plate-like metal band 16 which extends continuously across the front and along the side of the body. By means of rivets, through bolts or the like 17 passing through the band 16, the strips 11 and the vertical flanges of the angle iron members 14, the side and end walls of the body are joined rigidly to the floor A. Moreover, because of this rigid connection and because of the lower portions of the strips 11 extending below the floor, the body, considered as an entirety is, in transverse section, as previously indicated substantially of I-beam form so that it is exceptionally strong and rigid and the floor thereof is held effectively in its normal, flat condition against sagging under load.

At the rear end of the body the side walls thereof are stiffened and reinforced by uprights 18, one disposed against the outer face of each end strip 11 of the two side walls of the body. These reinforcing uprights 18 and the rear portions of the related strips 11 are encased by upright sheet metal members 19 of substantially U-shape in cross section, and securing said members 19 against said end strips 11 and the uprights 18, and also securing said uprights 18 against said end strips, are rivets, through bolts, or the like 20. As will be seen from Figs. 3 and 5, the uprights 18 are relieved of strain by the long tie bolt 18ª passing from one side of the body to the other through a groove formed in the floor A.

The band 16 is welded or otherwise suitably fastened at its rear ends to the lower, outer portions of the sheet metal members 19 and the upper angle iron member 14 is welded or otherwise suitably fastened at its rear ends to the lower, inner portions of said members 19. The extreme rear end, bottom portions of the side walls of the body thus are securely bonded to the side walls proper and to the floor A.

From the uprights 18 wedge shaped fairing-in filler blocks 21 extend forwardly suitable distances in underlying relationship to the rear end portions of the band 16, these fairing-in filler blocks being fastened in place by some of the rivets, bolts or the like 17 previously referred to.

Underlying the rearmost strip 10 of the floor A is a truss element 22 which extends transversely of the body substantially from side to side thereof and which is edged at its bottom by a channel lath 23 welded or otherwise suitably secured at its ends to the bottoms of the members 19. The bottom angle iron member 14 extends across the floor A, and the truss element 22 abuts the depending, vertical flange of said angle iron member 14. Moreover, an angle plate 24 has its horizontal flange resting upon the top of the rearmost floor strip 10 and its vertical flange disposed against the truss element 22. Furthermore, vertical rivets, through bolts or the like 25 extend through the horizontal flange of the angle plate 24, the rearmost strip 10 and the truss element 22 and its edging channel lath 23 and other rivets, through bolts or the like 26 extend through the vertical flange of the angle plate 24, the truss element 22 and the vertical flange of the angle iron member 14. The rearmost portion of the floor A thus is effectively stiffened and reinforced.

Extending across the front and along the sides of the body is one or more adjustable tension straps 27 which is, or are, disposed at a suitable elevation relative to the body and which, at its, or their, rear ends, is, or are, equipped with threaded rods 28 passing loosely through holes in the uprights 18 and having threaded thereon nuts 29 which, when turned, react from the uprights 18 to draw the strap, or straps, 27, into tight embracing relationship to the strips 11, and the strips 11 in turn tightly engage the edges of the floor strips 10. Thus, the strips 11 are securely drawn or compressed into tight, edge to edge relationship and the sides, front and bottom of the body are stiffened and reinforced in a manner to provide a rigid, unitary structure. Preferably, but not necessarily the metallic straps 27 are of U-shape in cross section with their flanges disposed inwardly. Preferably, too, suitable brackets or the like, such as the U-shaped brackets illustrated and designated as 27ª are fastened to the strips 11 in embracing relationship to the straps 27 to hold the latter against sliding vertically relative to said strips. The straps may be provided with elongated slots 27ᵇ (Fig. 8) to receive the fastenings 27ᶜ.

If desired, but not necessarily, the rear end portions of the metal straps 27, particularly the threaded rods 28 thereof, are protectively encased by sheet metal shield elements 30 fastened to the side walls of the body.

In order to stiffen, reinforce and protect the top edges of the front and the sides of the body an angle iron member 31 is disposed continuously around said edges with its horizontal flange overlying said edges and its vertical flange disposed against the inner faces of the strips 11. In addition, a channel lath member 32 is disposed against the outer faces of the strips 11 adjacent to the tops thereof and rivets, through bolts or the like pass through said channel lath member, the strips 11 and the vertical flange of the angle iron member 31 and securely fasten said channel lath member and said angle iron member in covering, embracing relationship to the tops of the strips 11. The front and the sides of the body at their upper edges thus are stiffened, reinforced and protected as aforesaid.

The tail gate C may be metal sheathed and preferably is stiffened and reinforced by suitable T-iron elements 34. Preferably, too, it is provided on its outer face with a pipe 35 extending thereacross to accommodate a chain by which it may be secured in closed or partly closed in accordance with known practice. The tail gate may be removable or it may be hinged at its bottom to the rear, bottom portion of the body as shown.

From the foregoing it will be apparent that the present invention is primarily directed to a transportation body including a floor and a wall which may constitute the sides and one end of the structure, the said wall comprising strips which are clamped about the edges of the floor by the tensioning straps or bands. This arrangement places the wall in compression and the floor is also compressed to produce an especially firm and tight body construction. In transverse cross-section the floor and walls produce in effect an I-beam section wherein the floor constitutes the flanges or chords thereof. The chord structure of the floor is reinforced by the angle irons 14 disposed in the inner included angles of the structure and the external band 16.

I claim:

1. A vehicle body, including, a floor comprising a plurality of strips laid in edge to edge formation transversely of the body, a continuous wall surrounding the opposite parallel side edges and the front end of the floor and terminating in spaced upright wings at the rear of the floor, said wall comprising vertically arranged strips provided with interlocking edge portions and having their lower ends projecting below the floor substantially to embrace the front and side edges thereof, tensioning straps arranged at the outer side of the wall and adjustably anchored at their ends near the said wings thereof to simultaneously compress the vertical strips comprising the wall and the horizontal strips of the floor into tightly reassembled relation.

2. A vehicle body, including, in combination, a floor comprising a plurality of interlocking strips arranged transversely of the body, said strips having their opposite edge portions cut to form the opposite parallel sides of the body and the strips near one end of the body having their ends cut on arcs to provide a substantially arched front end for the body, a wall comprising a plurality of vertically arranged strips surrounding the opposite edges and the arched end of the floor, said strips projecting above and below the plane of the floor to embrace all of the strips thereof, uprights at the rear end of the floor and arranged at the terminal ends of said wall, and tensioning bands anchored to said uprights and embracing the strips of said wall above the floor level to compress said strips together and in turn maintain the floor strips in tightly compressed relation.

3. A vehicle body, including, a floor having substantially parallel opposite side portions merging into a rounded front end portion, a wall comprising a plurality of vertical strips arranged in edge to edge relation and having their lower ends extending across and abutting the edge of the floor at the sides and at the rounded end thereof, means above the floor level for compressing the strips of the wall relative to each other and also against the said edges of the floor, angle members located in the upper and lower inner included angles between the floor and wall and having their horizontal flanges connected by fastenings piercing the floor, a substantially flat relatively wide reinforcing band covering the outer lower face of said wall in the area including the floor and angle members, and fastenings for connecting the vertical legs of said angle members to the band through the adjacent portions of the side wall above and below the floor, thereby to provide a body of substantially I-beam formation in cross-section at the level of the floor.

4. A body for trucks and the like and comprising a floor and vertical front and side walls, said floor and walls being made from interfitting tongue and grooved strips, the side walls being straight and the front walls merging into the side walls in rounded formation, uprights arranged at the rear ends of the side walls, bands disposed about the side walls and being of substantially U-shaped channel formation to provide parallel longitudinal flanges engaging the walls, said bands being slotted longitudinally at intervals in their length, headed screws extending through the slots and threaded into the walls for securing the bands to the latter for slidable movement thereon, bolts fixed within the channels of the bands and extending from the ends thereof, said bolts passing through the uprights and having threaded outer ends, washers mounted on the outer ends and bearing against the uprights and rear end strips of the side walls respectively, and nuts threaded on the bolts and engaging the washers for drawing the bands in tight association with respect to the walls for holding and securing the strips together in body and floor formation.

JOHN W. RICE.